Patented Dec. 5, 1922.

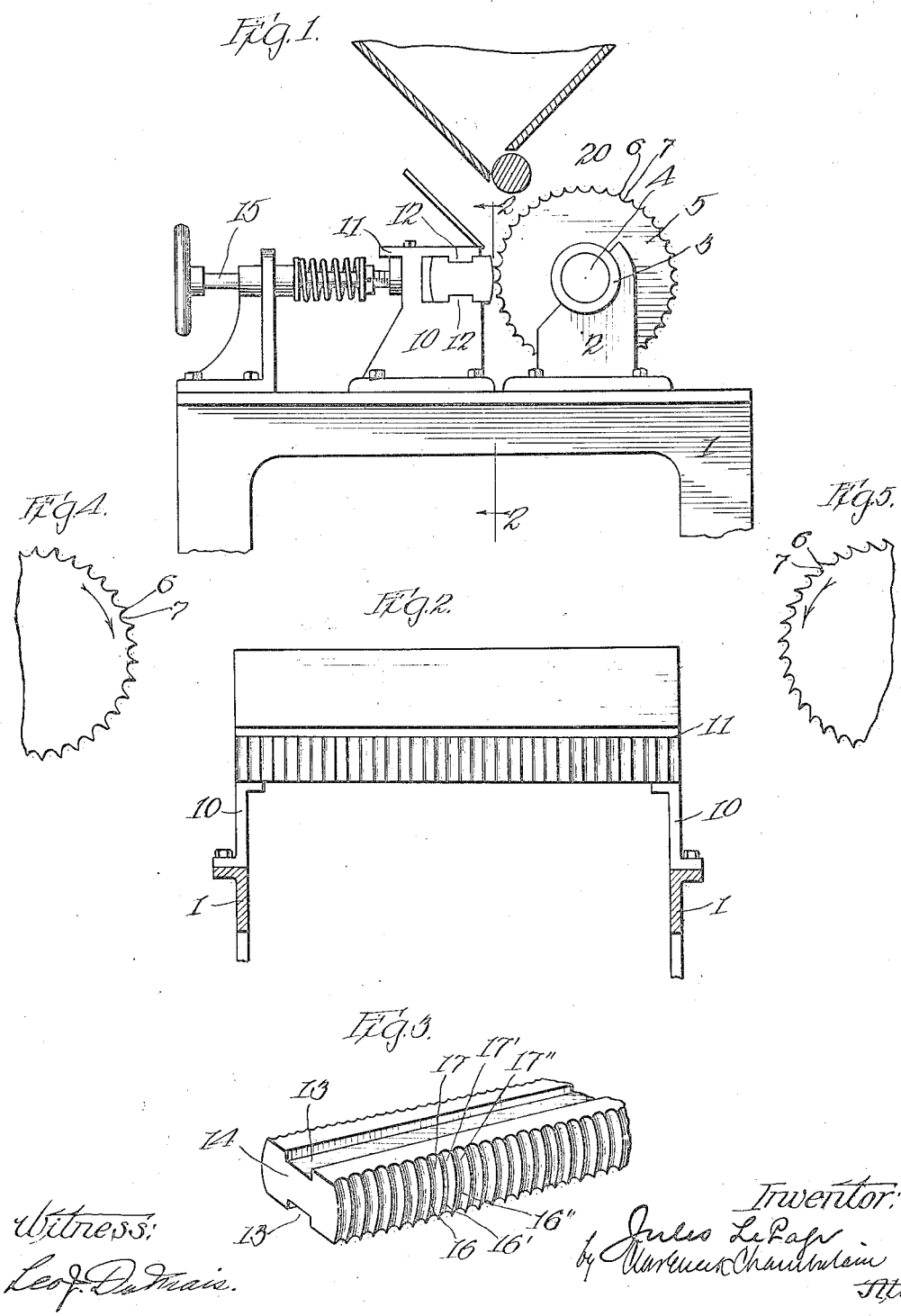

1,437,429

UNITED STATES PATENT OFFICE.

JULES LE PAGE, OF DARLINGTON, INDIANA.

MACHINE FOR MAKING STEEL-CUT CEREALS.

Application filed March 6, 1916, Serial No. 82,424. Renewed May 14, 1921. Serial No. 469,498.

*To all whom it may concern:*

Be it known that I, JULES LE PAGE, a citizen of the United States, residing at Darlington, in the county of Montgomery and State of Indiana, have invented certain new and useful Improvements in Machines for Making Steel-Cut Cereals, of which the following is a specification.

My invention relates to machinery which is used for preparing cracked corn, hominy and other cereal products by cracking the grain or cutting it rather than by crushing or grinding. In the preparation of these cracked products, sometimes known as "steel-cut" products, a considerable proportion of crushed by-product has usually been heretofore produced. By applying the principles of certain inventions set forth in applications co-pending herewith in the Patent Office I have been able to reduce the amount of by-product to a practically negligible one, while on the other hand, increasing the amount and quality of the product immediately sought to be obtained. My said inventions have had to do with certain forms of corrugations applied to the peripheries of milling rolls and their relation to each other. I have found that in practice for certain purposes it is possible to do away with one of the two rolls employed and to substitute for the slow moving roll stationary cutters similar to the corrugations heretofore used by me on the slow roll. I am therefore able to considerably reduce the cost of the machines and to provide a comparatively small and inexpensive machine which can be used where a larger or more elaborate one might be prohibitatively expensive.
The principles of my invention are illustrated in the drawings, in which—

Fig. 1 is a side elevation of a part of my machine, the housings being removed;

Fig. 2 is a section on line 2—2 of Fig. 1;
Fig. 3 is an enlarged perspective view of a cutter-bar;

Fig. 4 is an end view of a preferred, and

Fig. 5 a similar view of an alternative construction of a feed roll.
Referring to the drawings, in which like characters of reference denote like parts throughout: 1 is a framework, upon which are mounted the standards 2, in which at 3 is journaled the shaft 4 of a cutting roll, 5, preferably made in the form shown in Fig. 4. The same may be driven by gears or belts in any desirable manner. The face of said roll is provided with longitudinal corrugations or knives 6 integrally formed therein by longitudinal grooves 7, which should be rounded at the bottom so as to be substantially U-shaped in cross section. I prefer to give the cutting knives a forward inclination in the direction of the rotation of the roll. As shown in the alternative form in Fig. 5 the knives may be undercut so as to give a still thinner blade and to present a more facile cutting edge. A plurality of uprights 10 are slidably mounted on the frame 1, and the said uprights are combined into a rigid structure by the cross pieces 11 or other suitable means. Projections 12 are provided which are adapted to be received within the grooves 13 of the cutting bar 14, whereby the latter may be held in proper position relatively to the revolving roll 5, by the further aid of the spring adjusting device 15. The face of said bar is provided with any desired number of knives 16, 16′, 16″ extended on the face adjacent to the revolving roll. Said knives may be produced integrally with the bar itself by grooves 17, 17′, 17″, etc., which may have rounded bottoms, being thereby made substantially U-shaped in cross section. The said knives will be substantially at right angles to the axis of the revolving roll and in planes which if extended would also cut the knives of the revolving roll at right angles. The revolving roll and the cutter-bar should just clear each other. When corn or any other similar cereal is fed by the roll 20 in a thin stream to the angle formed between the roll and cutter-bar, the separate kernels will be caught by the knives of the roll and carried down by a drawing motion across the cutter-bar. The grooves between both sets of knives should be of a depth equal to or greater than the half thickness of the kernel of grain to be milled. The thin blades and capacious grooves of the forms shown cause easy cutting action and ready clearance of the cut particles. And, as co-action of the knives is not of a character to crush the grain, the particles of material are cleanly cracked or cut, leaving practically no fine by-product. It will further be observed that the cutter-bar may have cutting knives on both faces and that by having the separating grooves of different widths on the two faces products of different degrees of fineness may be produced on the same machine. Moreover, the faces on the cutter-bar may be of such contour or inclination as may be desired, and which will best carry out the principles of the invention.

The corrugations on roll 5 are shown as parallel to the longitudinal axis of the roll. Such corrugations may be helical if desired, although the best cutting results will not be obtained if the inclination is extreme. But any cut either parallel or helical on the roll is to be considered equally within the scope of my invention.

I claim:

1. In a cereal mill, a framework, a roll journaled thereon having a multiplicity of cutting corrugations substantially parallel to its longitudinal axis forwardly inclined in the direction of their rotation, and a multiplicity of stationary knives mounted on said framework in planes substantially at right angles to the longitudinal axis of said roll.

2. In a cereal mill, a framework, a roll journaled thereon having a multiplicity of cutting corrugations substantially parallel to its longitudinal axis forwardly inclined in the direction of their rotation separated from each other by rounded grooves, and a multiplicity of stationary knives mounted on said framework in planes substantially at right angles to the longitudinal axis of said roll.

3. In a cereal mill, a framework, a roll journaled thereon having a multiplicity of cutting corrugations forwardly inclined in the direction of their rotation, and a multiplicity of stationary knives mounted on said framework in planes substantially at right angles to the longitudinal axis of said roll.

4. In a cereal mill, a framework, a roll journaled thereon having a multiplicity of corrugations forwardly inclined in the direction of their rotation separated from each other by rounded grooves, and a multiplicity of stationary knives mounted on said framework in planes substantially at right angles to the longitudinal axis of said roll.

5. In a cereal mill, a framework, a roll journaled thereon having a multiplicity of corrugations parallel to its longitudinal axis forwardly inclined in the direction of their rotation separated from each other by rounded grooves, and a bar having a multiplicity of knives integrally formed separated from each other by rounded grooves mounted on said framework in operative relation to said roll in planes at right angles to the longitudinal axis thereof.

6. In a cereal mill, a framework, a roll journaled thereon having a multiplicity of corrugations parallel to its longitudinal axis undercut in the direction of their rotation separated from each other by rounded grooves, and a bar having a multiplicity of knives integrally formed separated from each other by rounded grooves mounted on said framework in operative relation to said roll in planes at right angles to the longitudinal axis thereof.

7. In a cereal mill: a framework, a roll journalled thereon, having a multiplicity of continuous cutting corrugations, substantially parallel to its longitudinal axis, and a multiplicity of stationary knives, separated from each other by grooves rounded at the bottom, mounted on said framework in operative relation to said roll.

8. In a cereal mill: a framework, a roll journalled thereon, having a multiplicity of cutting corrugations substantially parallel to its longitudinal axis, and a multiplicity of stationary knives, separated from each other by grooves rounded at the bottom, mounted on said framework in operative relation to said roll, in planes at substantially right angles to the longitudinal axis of said roll.

9. In a cereal mill: a framework, a roll journalled thereon, having a multiplicity of cutting corrugations, separated from each other by grooves rounded at the bottom, and substantially parallel to its longitudinal axis, and a multiplicity of stationary knives separated from each other by grooves rounded at the bottom forming an integral cutting bar, mounted on said framework in operative relation to said roll.

10. In a cereal mill: a framework, a roll journalled thereon having a multiplicity of cutting corrugations substantially parallel to its longitudinal axis, a cutting bar having a multiplicity of transverse knives on its operating face, and a support for said cutting bar adjustably slidable on said framework to bring said cutting bar in operative relation to said roll.

11. In a cereal mill; a framework, a roll journalled thereon having a multiplicity of cutting corrugations substantially parallel to its longitudinal axis, a cutting bar having a plurality of operating faces, each of said faces provided with a multiplicity of transverse knives, a support for said cutting bar, adjustably slidable on said framework, said cutting bar and said cutting bar support being so formed relatively to each other that the operating faces of said cutting bar may be placed alternatively in operative relation to said roll.

12. In a cereal mill having a framework; a roll journalled thereon provided with continuous cutting corrugations, a multiplicity of uniformly spaced knives, separated from each other by grooves rounded at the bottom, forming an integral cutting bar having a non-concave face and means for holding said cutting bar in operative relation to said roll.

13. In a cereal mill having a framework; a roll journalled thereon, provided with continuous cutting corrugations, a multiplicity of uniformly spaced knives, separated from each other by grooves rounded at the bottom forming an integral cutting bar having a convex face and means for holding said cutting bar in operative relation to said roll.

In witness whereof, I have hereunto subscribed my name this 16th day of February, 1916, in the presence of two subscribing witnesses.

JULES LE PAGE.

Witnesses:
C. K. CHAMBERLAIN,
A. S. PHILLIPS.